United States Patent [19]

Lozon

[11] 4,096,371
[45] Jun. 20, 1978

[54] METHOD OF AND APPARATUS FOR ELECTRICAL DISCHARGE MACHINING

[76] Inventor: Garnet W. Lozon, 4287 S. River Rd., St. Clair, Mich. 48079

[21] Appl. No.: 702,913

[22] Filed: Jul. 6, 1976

[51] Int. Cl.² .............................................. B23P 1/08
[52] U.S. Cl. ................................ 219/69 E; 219/69 M
[58] Field of Search ............... 219/69 E, 69 R, 69 M, 219/69 V

[56] References Cited

U.S. PATENT DOCUMENTS

| 2,902,584 | 9/1959 | Ullmann | 219/69 E |
| 3,622,734 | 11/1971 | Mainwaring | 219/69 E |

FOREIGN PATENT DOCUMENTS

| 35,840 | 6/1967 | Japan | 219/69 E |

Primary Examiner—Bruce A. Reynolds
Attorney, Agent, or Firm—Robert G. Mentag

[57] ABSTRACT

A method and tool electrode apparatus for electrical discharge machining. The tool electrode is a segmental electrode having an arcuate periphery in which is provided at least one undercut serration, as a conical undercut serration, around the arcuate periphery thereof. The tool electrode has a portion removed, which portion may take various shapes, so as to provide a longitudinal cutting face having a longitudinal cross section shape commensurate with the cross section shape of a cavity to be cut in a workpiece. The method includes placing the segmental tool electrode with its longitudinal cutting face in an operative position adjacent a workpiece, and then providing relative rotation between the tool electrode and the workpiece to move the tool electrode into and through the workpiece to cut a cavity into the workpiece which has a longitudinal cross section with undercut serrations that is the same as the longitudinal cross section shape of the tool electrode cutting face.

20 Claims, 19 Drawing Figures

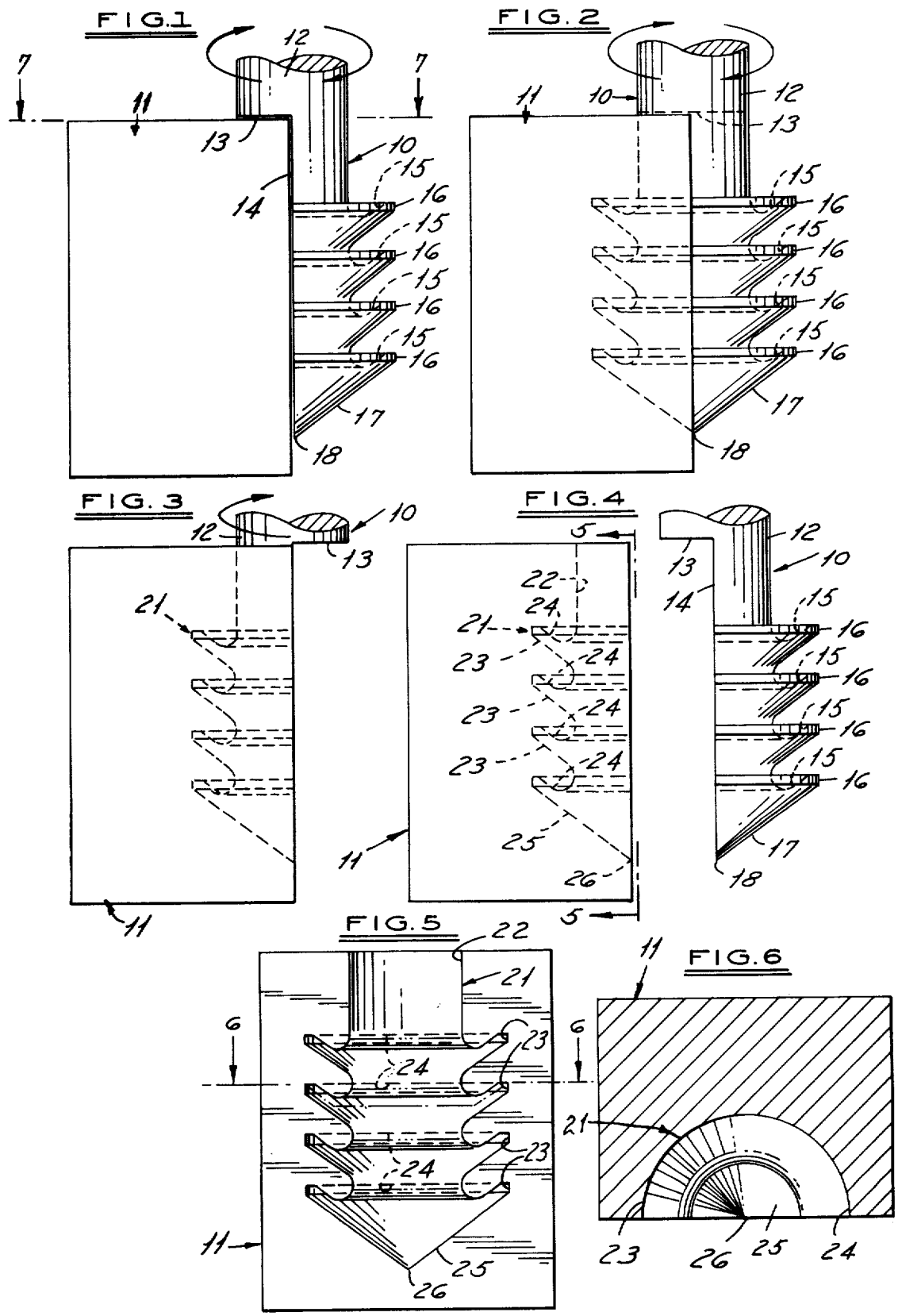

METHOD OF AND APPARATUS FOR ELECTRICAL DISCHARGE MACHINING

SUMMARY OF THE INVENTION

This invention relates to the electrical discharge machining art, and more particularly, to a novel method and tool electrode apparatus for electrical discharge machining.

Heretofore, it was not possible to machine certain undercut configurations, such as conical serrations, in workpieces such as plastic injection molds and the like by the use of the prior art methods and apparatus for electrical discharge machining because they were not capable of machining such configurations due to the structure and operating characteristics of said prior art methods and apparatus. Heretofore, when building plastic injection molds or other workpieces wherein undercut configurations, such as circular conical serrations, were required, it was necessary to make a plurality of separate precision machined inserts, using conventional machining methods and apparatus, and then assembling or stacking the inserts in a block to provide a mold or other workpiece provided with such circular conical serrations. The last described prior art method of providing a plastic injection mold or similar workpiece with such circular conical serrations is a costly and time consuming procedure. Accordingly, it is the primary object of the present invention to provide a novel and improved method and apparatus for electrical discharge machining of cavities into a solid metal workpiece wherein the cavity is provided with undercut serrations, as for example, circular conical serrations.

It is another object of the present invention, to provide a novel and improved segmental tool electrode for use in an electrical discharge machining apparatus for machining circular undercut serrations in workpieces, such as plastic injection molds and the like, without the need for making a plurality of separate serration inserts.

It is still another object of the present invention to provide a novel and improved electrical discharge machining method for machining a cavity having an arcuate outer periphery in a workpiece, including the steps of, forming a segmental tool electrode rotatable about its longitudinal axis with an arcuate outer periphery, and a longitudinal cutting face having a longitudinal cross section shape commensurate with the longitudinal cross section shape of a cavity to be cut in a workpiece, placing the tool electrode with its longitudinal cutting face in an operative position adjacent a workpiece, and providing relative rotation between the tool electrode and the workpiece to move the tool electrode into the workpiece to cut a cavity into the workpiece which has a longitudinal cross section that is the same as the longitudinal cross section shape of the tool electrode cutting face. The tool electrode is provided with at least one serration around the outer periphery thereof which is an undercut serration, as for example, a conical undercut serration.

It is a further object of the present invention to provide a tool electrode for electrical discharge machining of a cavity in a workpiece by relative rotation between the tool electrode and the workpiece, and which includes a body having an arcuate periphery, with an axially extended shaft on one end thereof for attachment of the electrode to an electrical discharge machining apparatus, and said body being provided with a longitudinal cutting face having a longitudinal cross section shape commensurate with the longitudinal cross section shape of a cavity to be cut in a workpiece when relative rotation between the tool electrode and the workpiece is effected for moving said cutting face and tool electrode into the workpiece.

Other objects, features and advantages of this invention will be apparent from the following detailed description, appended claims and the accompanying drawings.

BRIEF DESCRIPTION OF THE DRAWINGS

FIG. 1 is a side elevation view of a mold half workpiece and an electrode made in accordance with the principles of the present invention, and showing the electrode in a "start" position.

FIG. 2 is a view similar to FIG. 1, but showing the electrode cutting and rotated 90° into the mold half workpiece.

FIG. 3 is a view similar to FIG. 1, and showing the electrode cutting and rotated 180° into the mold half workpiece.

FIG. 4 is a view similar to FIG. 1, and showing the electrode removed from the mold half workpiece after a cavity has been cut into the mold half workpiece in accordance with the principles of the present invention.

FIG. 5 is a right side elevational view of the mold half workpiece shown in FIG. 4, taken along the line 5—5 thereof, and looking in the direction of the arrows, and showing the cavity cut into the mold half workpiece.

FIG. 6 is a horizontal section view of the mold half workpiece illustrated in FIG. 5, taken along the line 6—6 thereof and looking in the direction of the arrows.

DETAILED DESCRIPTION OF THE PREFERRED EMBODIMENTS

Figure 8:
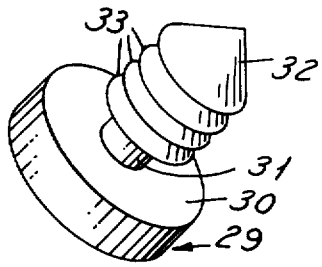
FIG. 8 is an elevational perspective view of a serrated plastic retainer member produced from the pair of mold halves illustrated in FIGS, 4, 5 and 6.

Referring now to the drawings, and in particular to FIGS. 1 through 4, the numeral 10 generally designates a first embodiment of an electrode made in accordance with the principles of the present invention, for use in forming conical undercuts or serrations in a workpiece by an electrical discharge machining process. The numeral 11 generally designates a workpiece which is shown to be in the form of a block, and in particular a block employed as a mold half for a plastic injection mold to form a retainer member, as shown in FIG. 8.

The electrode 10 is provided with a cylindrical shaft or shank 12, which is solid and which would be held by a suitable platen or tool holder. The workpiece 11 is supported on a suitable platen or base, and the electrical discharge machining operation is then carried out by either rotating the electrode 10 or the workpiece 11. The electrical discharge machining is preferably carried by rotating the electrode tool 10 into the workpiece 11. The platens or tool holders and workpiece holders are not shown, since any conventional electrical discharge apparatus may be employed for holding the electrode tool 10 and the workpiece 11 in their respective operative positions, and for operating the electrode tool 10 and providing the rotating drive means for the same, and for providing the necessary means for automatically controlling the spark gap between the electrode tool 10 and the workpiece 11 during an electrical discharge machining operation. Any conventional, prior art electrical discharge machining apparatus may be employed as, for example, the electrical discharge machining apparatus shown in the prior art U.S. Pat. Nos. 2,887,561, 3,035,149 and 2,835,784.

Figure 7:
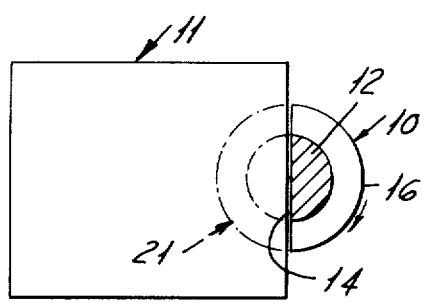
FIG. 7 is a top view of the mold half illustrated in FIG. 1, taken along the line 7—7 thereof, and showing the position of the cathode illustrated in FIG. 1 when it is in the "start" position and prior to a cutting operation.

As shown in FIG. 1, the electrode shaft 12 is provided with a transverse, downwardly facing shoulder 13 which extends inwardly to a plane 14 which passes through the longitudinal centerline of the electrode 10. Accordingly, it will be seen that the electrode 10, from the shoulder 13 downwardly, as viewed in FIGS. 1 and 7, comprises what may be termed a split or one-half segmental electrode, because half of the electrode 10 has been removed. As shown in FIG. 1, the electrode shaft 12 extends downwardly from the shoulder 13, and it terminates at an outwardly extended conical and peripherally formed tooth 16.

The electrode 10 includes a plurality of such conical teeth 16. They are axially and evenly spaced apart from each other, and they are each provided on the upper side thereof with an undercut portion 15. The curved surfaces of the undercut portions 15 blend in with and are continuations of the conical lower faces 17 of the cutting teeth 16. As shown in FIG. 1, the conical face 17 on the lowermost cutting tooth 16 converges inwardly and terminates at a point or tip 18.

Although it will be understood that either the workpiece 11 or the electrode 10 may be rotated, the embodiment of FIGS. 1 through 8 is illustrated as having the workpiece 11 held stationary while the electrode 10 is rotated. In practicing the electrical discharge method of the present invention, the electrode 10 is brought to the "start" position shown in FIG. 1, with the shoulder 13 in a position over and spaced from the upper face of the workpiece 11, and with the inner side surface or plane 14 of the electrode 10 in position operatively spaced apart from the adjacent side of the workpiece 11. The electrode 10 is then rotated in a clockwise direction by the aforedescribed conventional electrical discharge machining apparatus so as to allow a mold cavity 21 in the workpiece 11 to be burned away or formed as the electrode 10 is rotated into the workpiece 11. FIG. 2 shows the electrode 10 rotated 90° into the workpiece 11. FIG. 3 shows the electrode 10 rotated 180° into the workpiece 11 so as to completely form the desired mold cavity, generally indicated by the numeral 21, with the desired undercut conical serrations designated by the numerals 23 and 24. The shaft 12 forms an axial passage 22 as indicated in FIG. 4, as the half-segment portion thereof is rotated through the workpiece 11.

FIGS. 4, 5 and 6 show the finished mold cavity 21 formed in the workpiece 11, with its undercut conical serrations designated by the numerals 23 and 24. The numeral 25 in FIGS. 5 and 6 designates the half-conical surface of the lower end of the cavity 21. The numeral 26 designates the tip or lower end of the cavity conical surface.

FIGS. 5 and 6 show the half-round cavity 21 formed in the workpiece or mold half 11 with its undercut conical serrations. It will be understood that a second mold half 11 would be provided with a similarly formed half-round cavity 21 so as to provide two mold halves for forming a product as illustrated in FIG. 8, by a suitable molding process, as for example, an injection molding process.

As shown in FIG. 8, the final product which would be produced by a pair of mold halves 11 provided with cavities 21 is designated generally by the numeral 29. The product 29 is a retainer having a circular head 30 from which is integrally extended a shaft 31 that carries a plurality of separate conical retainer teeth 33, with undercuts corresponding to the undercuts in the cavities 21. The numeral 32 designates the tip of the retainer 29.

It will be seen that the novel and improved electrode 10 of the present invention allows machining of conical undercuts or recesses in workpieces which heretofore could not be machined by any conventional electrical discharge machining electrodes or methods. When using the electrode 10, the edges of the electrode are brought to within a few thousands of the workpiece to be machined, and then relative rotation ensues between the electrode 10 and the workpiece 11 to allow the metal to be burned away. The electrode 10 is made from any suitable conventional material presently employed for making electrical discharge machine electrodes. The material from which the workpiece 11 is made must be an electrical conductor.

Although the segmental electrode 10 is shown as having conical serrations or undercuts, it should be understood that the form of the electrode is determined by the configuration of the workpiece, the desired location of the center and the shape of the cavity to be machined.

In order to obtain the proper positioning of the electrode 10, a segment or portion of the electrode is removed when making the electrode. In the embodiment illustrated in FIGS. 1 through 8, half of the electrode was removed. The electrodes discussed hereinafter and shown in FIGS. 9 through 19 illustrate other embodiments of the invention which show that the shape of the electrode may be but is not limited to a chord, an arcuate portion, a two-sided portion, or a niche. The axis of the electrode must always be aligned with the longitudinal axis of the workpiece, and a space or gap is allowed between the cutaway portion of the electrode and the workpiece so that the electrical discharge machine may not be shorted out. A practical limit to the minimum size of the electrode would be that there must be enough electrode material left solid to allow proper flushing. The method and electrode of the present invention is very suitable for building plastic injection molds, and the like, but it will be understood that the invention may be employed in other electrical discharge machine operations.

Figure 9:
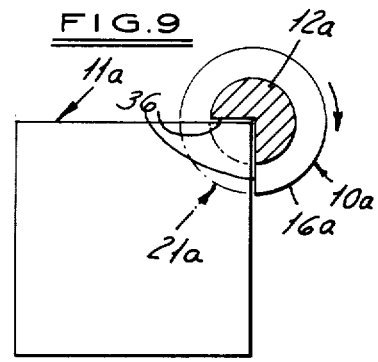
FIG. 9 is a view similar to FIG. 7 and showing a three-quarter segmental electrode, made in accordance with the principles of the present invention and adapted to cut a full quarter cavity in a corner of a mold quarter workpiece, and showing the electrode in the "start" position.

FIG. 9 illustrates another embodiment of the invention, wherein a three-quarter segment electrode is provided for cutting a full quarter of a cavity in a corner of a mold quarter workpiece designated by the numeral 11a. The parts of the embodiment of FIG. 9 which are the same as the parts of the first embodiment shown in FIGS. 1 through 7 have been marked with the same reference numerals followed by the small letter "a".

The three-quarter segmental electrode is generally designated by the numeral 10a, and it has a one-quarter portion or sector removed therefrom along the radial longitudinal planes designated by the numerals 36. The segmental electrode 10a is shown as positioned with a corner of the workpiece 11a received in the recess formed by the removal of a portion of the electrode, and with the electrode 10a in a spaced "start" position. The numeral 21a generally designates schematically a full one-quarter cavity which would be formed in the workpiece 11a with conical serrations the same as formed in the workpiece 11 when the electrode 10a is rotated clockwise, as viewed in FIG. 9 during an electrical discharge machining operation. It will be understood that a full mold would comprise four of the mold quarter workpieces 11a, with each having a one-quarter cavity 21a so as to provide a complete cavity for forming a workpiece. While half and quarter section molds have been used as illustrations, the method can be used on molds having a plurality of sections.

Figure 10:
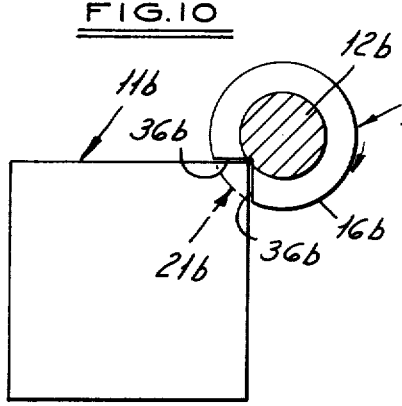
FIG. 10 is a view similar to FIG. 7, and showing segmental electrode made with a longitudinal niche, and wherein the electrode is adapted to cut only the undercut portion of a cavity in the corner of a mold part workpiece.

FIG. 10 illustrates still another embodiment of the invention, wherein a segmental electrode 10b is made with a longitudinal niche formed by removing a pie-shaped sector from the electrode, with the sides of the recess so formed lying along perpendicular intersecting chord planes designated by the numerals 36b. The parts of the embodiment of FIG. 10 which are the same as the parts of the first embodiment shown in FIGS. 1 through 7, and the second embodiment shown in FIG. 9, have been marked with the same reference numerals followed by the small letter "b".

The segmental electrode 10b is shown as positioned with a corner of a workpiece 11b received in the recess formed by the removal of a sector or portion of the electrode, and with the electrode 10b in a spaced "start" position. The numeral 21b generally designates schematically the undercut portion of a part of a cavity which would be formed in the workpiece 11b when the electrode 10b is rotated clockwise, as viewed in FIG. 10. It will be understood that mating workpieces would have more complete cavity portions formed therein for mating with the workpiece 11b to form a complete mold cavity.

Figure 11:
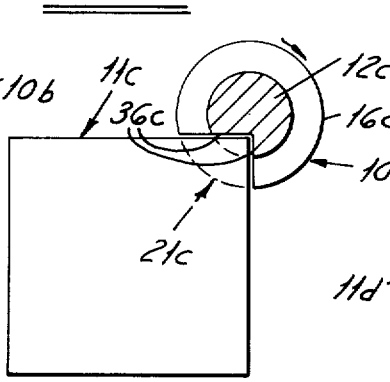
FIG. 11 is a view similar to FIG. 10, and showing a segmental electrode, with an enlarged longitudinal niche, which is adapted to cut a portion of a cavity in a corner of a mold part workpiece.

FIG. 11 illustrates still a further embodiment of the invention, wherein a segmental electrode 10c is made with a longitudinal niche formed by removing a pie-shaped sector from the electrode, with the sides of the recess so formed lying along perpendicular intersecting chord planes designated by the numeral 36c, with one of the chord planes being of a greater width than the other. The parts of the embodiment of FIG. 11 which are the same as the parts of the first embodiment of FIGS. 1 through 7, and the second and third embodiments of FIGS. 9 and 10, respectively, have been marked with the same numerals followed by the small letter "c".

The segmental electrode 10c is shown as positioned with a corner of a workpiece 11c received in the recess formed by the removal of a sector or a portion of the electrode, and with the electrode 10c in a spaced "start" position. The numeral 21c generally designates schematically the undercut portion of a part of the cavity which would be formed in the workpiece 11c when the electrode 10c is rotated clockwise, as viewed in FIG. 11. It will be understood that the electrode 10c functions in a manner similar to the electrode 10b. It will be understood that mating workpieces would have more complete cavity portions formed therein for mating with the workpiece 11c to form a complete mold cavity.

Figure 12:
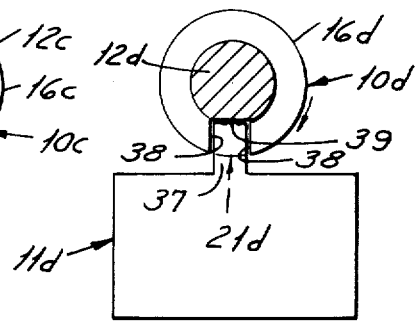
FIG. 12 is a view similar to FIG. 7 and showing a segmental electrode provided with a radial slot in which is received the end of a workpiece, and wherein the electrode is adapted to form the uncut portion only of a cavity in a mold part workpiece.

FIG. 12 illustrates a still further embodiment of the invention wherein a segmental electrode 10d is made with a radial slot in which the radially directed sides are indicated by the numerals 38, and the transverse side at the inner end of the slot is indicated by the numeral 39. The parts of the embodiment of FIG. 12 which are the same as the parts of the first embodiment of FIGS. 1 through 7, have been marked with the same reference numerals followed by the small letter "d".

The workpiece 11d is shown as being provided with a T-shape, wherein the leg of the T is inserted within the slot formed in the segmental electrode 10d in a position spaced apart from the electrode 10d so that the electrode 10d is in a "start" position. When the segmental electrode 10d is rotated clockwise, as viewed in FIG. 12, a series of little undercuts or serrations would be formed in the outer end of the workpiece portion 37. The protruding portion 37 of the workpiece 11d would be used for mating with a U-shaped mold workpiece having no cavity for forming small plastic parts which would be formed somewhat like thumb nails. The final product thus formed by the workpiece 11d would be different in configuration than the workpiece shown in FIG. 8.

Figure 13:
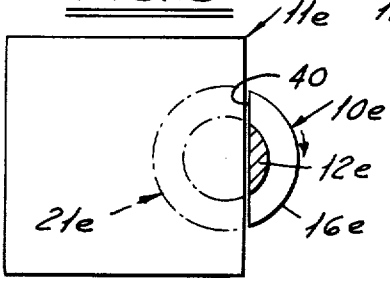
FIG. 13 is a view similar to FIG. 7, and showing a segmental electrode which has a cutting face formed along a chord and which electrode is adapted to cut more than one half of a cavity in a mold part workpiece.

FIG. 13 illustrates another embodiment of the invention wherein a segmental electrode 10e is shown as having a cutting face formed along a chord plane indicated by the numeral 40, and wherein the electrode 10e is adapted to cut slightly more than one-half of a cavity in a mold part workpiece 11e. The parts of the embodiment of FIG. 13 which are the same as the parts of the first embodiment of FIGS. 1 through 7, have been marked with the same reference numerals followed by the small letter "e".

As shown in FIG. 13, the electrode 10e is formed so as to be less than one-half of a complete circular electrode, as shown in plan view in FIG. 13. The illustration is exaggerated to show that the electrode 10e can be used to form a little more than one-half of a complete cavity. The centerline of the cavity would be offset inwardly, or to the left as viewed in FIG. 13, any desired distance, as for example 0.020 inches, from the right edge of the mold part workpiece 11e. Accordingly, a small undercut would be formed at the outer edges of the cavity portion 21e which would function to hold a product part formed in the workpiece 11e in the cavity portion 21e. Therefore, when the mold parts are separated, the product part would be pulled free from the other part of the mold, and be left in the workpiece 11e from where it would be removed by suitable ejector pins. The electrode 10e may leave a little unmachined tip at the outer end of the cavity which may have to be machined out by conventional methods, if desired. On the other hand, the center portion of the schematically illustrated cavity portion 21e could be initially rough machined by a conventional machining method prior to the electrical discharge machining operation by the electrode 10e, whereby no remaining portion would be left in the cavity when the electrode 10e is rotated clockwise, as viewed in FIG. 13. It will be understood that a mating workpiece or mold part would have a cavity portion formed therein for mating with the workpiece 11e which would have a cavity portion that is less than a complete half of the complete final cavity (cavity portion 21f of FIG. 14) so as to mate with the cavity portion 21e shown in FIG. 13.

Figure 14:
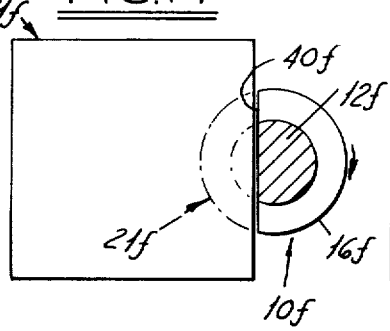
FIG. 14 is a view similar to FIG. 7, and showing an electrode larger than one half, and having a cutting edge formed along a chord line, and wherein the electrode is adapted to cut the other portion of a cavity in a mold half workpiece which would mate with the mold half workpiece shown in FIG. 13 to form a complete cavity in a pair of mold halves.

FIG. 14 illustrates still another embodiment of the invention wherein a segmental electrode 10f is shown as having a cutting face formed aong a chord plane indicated by the numeal 40f, and wherein the electrode 10f is adapted to cut slightly less than half of a cavity in a mold part workpiece 11f. The parts of the embodiment of FIG. 14 which are the same as the parts of the first embodiment of FIGS. 1 through 7, have been marked with the same reference numerals followed by the small letter "f".

As shown in FIG. 14, the electrode 10f is formed so as to be greater than half of a complete circular electrode. As shown in plan view in FIG. 14, the illustration is exaggerated in an opposite manner to the illustration of FIG. 13. The centerline or rotational axis of the electrode 10f is offset outwardly, or to the right side of the adjacent edge of the mold part workpiece 11f. Accordingly, the schematically illustrated cavity portion 21f would be less than a complete half of a full cavity, and it would mate with the cavity 21e in the workpiece 11e to form a complete final cavity. The axial centerline of the electrode 12f would be offset from the adjacent edge of the workpiece 11f any desired distance, as for example, 0.020 inches, which is less than the exaggerated illustration of FIG. 14. The electrode 10f would be rotated clockwise, as viewed in FIG. 14, for cutting the schematically illustrated cavity portion 21f.

Figure 15:
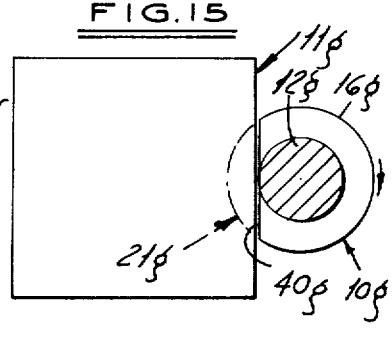
FIG. 15 is a view similar to FIG. 14, and showing a slightly larger electrode which is disposed to cut a smaller portion of the cavity in a mold half workpiece than that which would be cut by the electrode shown in FIG. 14.

FIG. 15 illustrates a further embodiment of the invention, wherein a segmental electrode 10g is shown as having a cutting face formed along a chord plane indicated by the numeral 40g, and wherein the electrode 10g is adapted to cut a smaller portion of a cavity in a mold part workpiece than the electrode 10f of the previously described FIG. 14. The parts of the embodiment of FIG. 15, which are the same as the parts of the first embodiment of FIGS. 1 through 7, and the embodiment of FIG. 14, have been marked with the same reference numerals followed by the small letter "g".

The electrode 10g is formed so as to be slightly larger than the electrode 10f of FIG. 14. The centerline or the rotational axis of the electrode 10g is offset outwardly, or to the right of the adjacent edge of the mold part workpiece 11g. Accordingly, the schematically illustrated cavity portion 21g would be less than a complete half of the full cavity, and it would be less than the partial cavity of 21f of FIG. 14. The axial centerline of the electrode 10g as illustrated at an exaggerated offset distance, and in actual practice said distance would not be that great. The electrode 10g would be rotated clockwise as viewed in FIG. 14 for cutting the schematically illustrated cavity portion 21g. It will be understood that a mating workpiece or mold part would have a cavity portion formed therein for mating with the workpiece 11g.

Figure 16:
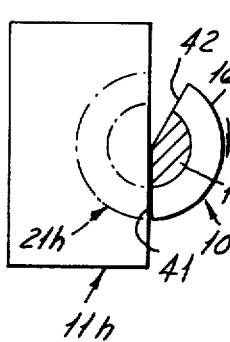
FIG. 16 is a view similar to FIG. 7, and showing a segmental electrode which is adapted to cut a full half cavity in a mold half workpiece, but wherein the electrode has a segmental body of less than 180° in plan view shape.

FIG. 16 illustrates a still further embodiment of the invention wherein a segmental electrode 10h is shown as having a cutting face formed along two radial lines 41 and 42, so as to produce an electrode which is less than half of a full electrode, as seen in plan view of FIG. 16. The parts of the embodiment of FIG. 16 which are the same as the parts of the first embodiment of FIGS. 1 through 7, have been marked with the same reference numerals followed by the small letter "h".

The electrode 10h is positioned with one face 41 of the electrode operatively spaced apart and positioned adjacent the right side of the workpiece 11h, as viewed in FIG. 16, so that the electrode 10h is in a "start" position. The numeral 21h generally designates schematically the undercut portion of a complete half cavity portion which would be formed in the workpiece 11h. It will be understood that a mating workpiece would have a similar complete half cavity portion formed therein for mating with the workpiece 11h to form a complete mold cavity. The electrode 10h would be rotated in a clockwise direction, as viewed in FIG. 16, during a cutting operation.

Figure 17:
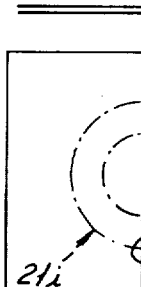
FIG. 17 is a view similar to FIG. 7, and showing a segmental electrode which has a segmental body of less than one quarter of a complete electrode, and which is adapted to cut a full half cavity in a mold half workpiece.

FIG. 17 covers another embodiment of the invention wherein a segmental electrode 10i of less than a quarter of a complete electrode is employed. The parts of the embodiment of FIG. 17 which are the same as the parts of the first embodiment of FIGS. 1 through 7, and FIG. 16, have been marked with the same reference numerals followed by the small letter "i".

The electrode 10i is shown in a "start" position with the cutting face 41i in a position operatively spaced apart from the right side of the workpiece 11i, as viewed in FIG. 17. When the electrode 10i is rotated in a clockwise direction, as viewed in FIG. 17, the electrode 10i will cut a complete half cavity portion 21i in the same manner as the electrode 10h illustrated in FIG. 16. It will be understood that a mating mold part workpiece would be provided with another complete half cavity portion formed therein for mating with the workpiece 11*i* to provide a complete mold cavity.

Figure 18:
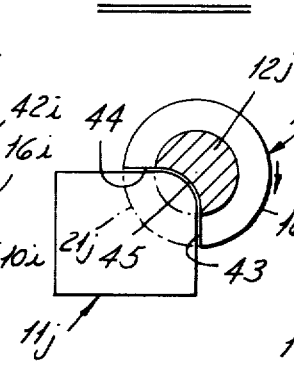
FIG. 18 is a view similar to FIG. 9, and showing a three quarter segmental electrode which is provided with a radius at the inner end of the recess so as to cut a cavity in a corner of a mold quarter workpiece, and which is adapted to cut a full one quarter cavity in a mold quarter workpiece.

FIG. 18 illustrates still another embodiment of the invention wherein a segmental electrode 10*j* is shown as being formed as three-quarters of a complete electrode, with a 90° removed portion along the radius lines 43 and 44, and wherein the radius lines are connected by a curved recess wall 45. The parts of the embodiment of FIG. 18 which are the same as the first embodiment of FIGS. 1 through 7, have been marked with the same reference numerals followed by the small letter "*j*".

The segmental electrode 10*j* is shown as positioned with the recess formed by the removed portion positioned over the adjacent round corner of a mold part workpiece 11*j*, and in a spaced "start" position. The numeral 21*j* designates schematically the undercut portion of a part of a cavity which would be formed in the workpiece 11*j* when the electrode 10*j* is rotated clockwise, as viewed in FIG. 18. The electrode 10*j* is positioned with its axial centerline at the imaginary intersection point of the two adjacent side surfaces of the workpiece 11*j*. The workpiece 11*j* with its partial cavity 21*j* would be used with mating workpieces having cavity portions that would function to make a complete desired mold cavity.

Figure 19:
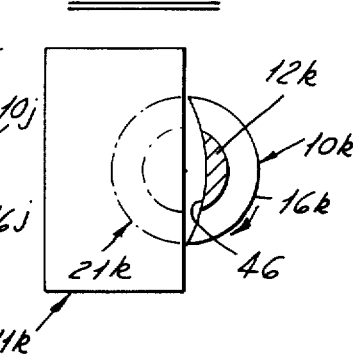
FIG. 19 is a view similar to FIG. 7, and showing a segmental electrode of less than one half of a complete electrode, and which has a concave chordal cutting face, and which is adapted to cut a full half cavity in a mold half workpiece.

FIG. 19 illustrates still another embodiment of the invention wherein a segmental electrode 10*k* is shown as having a concave arcuate cutting face 46. The parts of the embodiment of FIG. 19 which are the same as the parts of the first embodiment of FIGS. 1 through 7 have been marked with the same reference numerals followed by the small letter "*k*".

Electrode 10*k* illustrates that a segmental electrode made in accordance with the invention need not have a straight cutting face, but that it can take another shape, as for example an arcuate shape, as indicated by the numeral 46. The segmental electrode 10*k* is shown in a "start" position adjacent the right side of the workpiece 11*k*. The numeral 21*k* generally designates schematically the undercut portion of a complete half of a cavity portion which would be formed in the workpiece 11*k* when the electrode 10*k* is rotated clockwise, as viewed in FIG. 19. It will be understood that a mating workpiece would have a mating complete half cavity portion formed therein for mating with the workpiece 11*k* to form a complete mold cavity.

In the illustrations of FIG. 7 and FIGS. 9 through 19, the holes which would be cut by the shafts of the various electrodes are not shown, since the cavities are schematically illustrated. It will also be understood that the electrodes of the present invention would be provided with the usual suitable holes or passages for conduction of the dielectric fluid for operational and flushing purposes. It will also be understood that in some of the illustrated electrodes, the center portion of the partial cavity to be formed may be rough machined initially by conventional methods and apparatuses, as for example, the workpieces illustrated in FIGS. 13 and 19 may have the center portions of the cavities 21*e* and 21*k* rough machined out by conventional machining methods before the electrodes shown in these FIGS. are employed to complete the final forming of the respective partial cavities shown in these FIGS.

It will be seen that the present invention provides a novel and improved method and electrode for forming undercut serrations in a workpiece, as indicated by the illustrated conical serrations. The method of the present invention employs a split or segmental tool electrode, and the rotating of the same through a workpiece, without any linear motion, along the rotational axis of the electrode. The relative rotation between the workpiece and the tool electrode may be provided by either rotating the tool electrode and holding the workpiece stationary, or by holding the tool electrode stationary and rotating the workpiece. It will also be seen that the longitudinal face of each of the segmental tool electrodes comprises a longitudinal cutting face having a longitudinal cross section shape commensurate with the longitudinal cross section shape of the cavity to be cut into a workpiece.

While it will be apparent that the preferred embodiments of the invention herein disclosed are well calculated to fulfill the objects above stated, it will be appreciated that the invention is susceptible to modification, variation and change.

What is claimed is:

1. An electrical discharge machining method of machining a cavity having an arcuate outer periphery in a workpiece, including the steps of:
   a. forming a segmental tool electrode rotatable about its longitudinal axis with an arcuate outer periphery and a longitudinal cutting face having a longitudinal cross section shape commensurate with the longitudinal cross section shape of a cavity to be cut in a workpiece, and with the tool electrode having at least one peripheral undercutting cutting tooth;
   b. placing the tool electrode with its longitudinal cutting face in an operative position adjacent a workpiece; and,
   c. providing relative rotation between the tool electrode and the workpiece about the longitudinal axis of the tool electrode to move the tool electrode into the workpiece to cut a cavity with longitudinally extended undercut serrations through the workpiece, and which cavity has a longitudinal cross section that is the same as the longitudinal cross section shape of the tool electrode cutting face.

2. An electrical discharge machining method as defined in claim 1, wherein:
   a. said tool electrode is provided with at least one undercut shaped surface portion on the upperside of said cutting tooth and an inwardly extended shaped surface on the outer periphery of said cutting tooth.

3. An electrical discharge machining method as defined in claim 1, wherein:
   a. said tool electrode is provided with at least one conical undercut cutting tooth around the outer periphery thereof.

4. An electrical discharge machining method as defined in claim 1, wherein:
   a. said workpiece is held stationary and said tool electrode is rotated into and through said workpiece in a continuous manner.

5. A tool electrode for electrical discharge machining a cavity in a workpiece by relative rotation between the tool electrode and the workpiece, comprising:
   a. a body having an arcuate periphery, and an axially extended shaft on one end thereof for attachment to an electrical discharge machining apparatus, and at least one peripheral undercutting cutting tooth; and,
   b. said body being provided with a longitudinal cutting face having a longitudinal cross section shape commensurate with the longitudinal cross section shape of a cavity to be cut in a workpiece when relative rotation between the tool electrode and the workpiece is effected for moving said cutting face and tool electrode into the workpiece.

6. A tool electrode for electrical discharge machining as defined in claim 5, wherein:
 a. said tool electrode is provided with at least one cutting tooth around the outer periphery thereof.

7. A tool electrode for electrical discharge machining as defined in claim 6, wherein:
 a. said at least one cutting tooth has an undercut portion on the periphery thereof.

8. A tool electrode for electrical discharge machining as defined in claim 6, wherein:
 a. said at least one undercut portion is a conical undercut portion.

9. A tool electrode for electrical discharge machining as defined in claim 8, wherein:
 a. said tool electrode includes a plurality of conical undercut cutting teeth.

10. A tool electrode for electrical discharge machining as defined in claim 5, wherein:
 a. said body is half-round in plan view configuration with a straight side that comprises said longitudinal cutting face.

11. A tool electrode for electrical discharge machining as defined in claim 5, wherein:
 a. said body is three-quarters round in plan view configuration with two intersecting straight sides wherein one of said sides comprises said longitudinal cutting face.

12. A tool electrode for electrical discharge machining as defined in claim 5, wherein:
 a. said body has a portion removed to provide a plan view configuration showing an equal sided, right-angled niche in the periphery of the body, with one side of the niche comprising said longitudinal cutting face.

13. A tool electrode for electrical discharge machining as defined in claim 5, wherein:
 a. said body has a portion removed to provide a plan view configuration showing an unequal sided, right-angled niche in the periphery of the body, with one side of the niche comprising said longitudinal cutting face.

14. A tool electrode for electrical discharge machining as defined in claim 5, wherein:
 a. said body has a portion removed to provide a plan view configuration showing a radial slot in the periphery of the body, with one side of said slot comprising said longitudinal cutting face.

15. A tool electrode for electrical discharge machining as defined in claim 5, wherein:
 a. said body has a portion removed to provide a plan view configuration of less than one-half total round configuration, and a chordal face along one side thereof which includes said longitudinal cutting face.

16. A tool electrode for electrical discharge machining as defined in claim 5, wherein:
 a. said body has a portion removed to provide a plan view configuration of more than one-half total round configuration, and a chordal face along one side thereof which includes said longitudinal cutting face.

17. A tool electrode for electrical discharge machining as defined in claim 5, wherein:
 a. said body is less than half-round in plan view configuration with two longitudinal, radial side faces, and one of said faces comprises said longitudinal cutting face.

18. A tool electrode for electrical discahrge machining as defined in claim 5, wherein:
 a. said body is less than quarter-round in plan view configuration with two longitudinal, radial side faces, and one of said faces comprises said longitudinal cutting face.

19. A tool electrode for electrical discharge machining as defined in claim 5, wherein:
 a. said body is three-quarters round in plan view configuration with two longitudinal, radial side faces having connected inner arcuate ends, and wherein one of said side faces comprises said longitudinal cutting face.

20. A tool electrode for electrical discharge machining as defined in claim 5, wherein:
 a. said body is crescent shaped in plan view configuration with one side being concave arcuate in plan view and including said longitudinal cutting face.

* * * * *

UNITED STATES PATENT OFFICE
CERTIFICATE OF CORRECTION

Patent No. 4,096,371    Dated June 20, 1978

Inventor(s)  Garnet W. Lozon

It is certified that error appears in the above-identified patent and that said Letters Patent are hereby corrected as shown below:

Title and Abstract page, item (76) Inventor's address
        should be --R.R. #2, East China Township, Michigan--.
    Column 2, line 35, delete "cathode" and insert --electrode--.

Signed and Sealed this

*Fourteenth* Day of *November 1978*

[SEAL]

*Attest:*

RUTH C. MASON
*Attesting Officer*

DONALD W. BANNER
*Commissioner of Patents and Trademarks*